United States Patent [19]

Lynn

[11] 3,902,191

[45] Aug. 26, 1975

[54] TRANSIENT SUPPRESSION FOR TAPE PLAYER INTEGRATED CIRCUIT PREAMPLIFIER

[75] Inventor: Wilbur E. Lynn, Chalfont, Pa.

[73] Assignee: Aeronutronic Ford Corporation, Blue Bell

[22] Filed: Apr. 19, 1974

[21] Appl. No.: 462,255

[52] U.S. Cl. ................................ 360/61; 307/247 A

[51] Int. Cl. ........................ G11b 15/12; H03k 17/16

[58] Field of Search ................... 360/61; 307/247 A; 325/170; 330/149

*Primary Examiner*—Bernard Konick
*Assistant Examiner*—R. S. Tupper
*Attorney, Agent, or Firm*—Robert D. Sanborn

[57] ABSTRACT

In a tape player the preamplifier integrated circuit can produce a transient, when the player is turned off, that will impress itself on the head thereby recording a noise signal on the tape. A circuit is shown for suppressing such transients. A diode is connected in series with the power supply so that when the player is turned off, the diode disconnects the preamplifier from the power supply. In addition a large value filter capacitor is connected across the preamplifier terminals so that the applied voltage can change only at a relatively slow rate.

4 Claims, 1 Drawing Figure

PATENTED AUG 26 1975
3,902,191
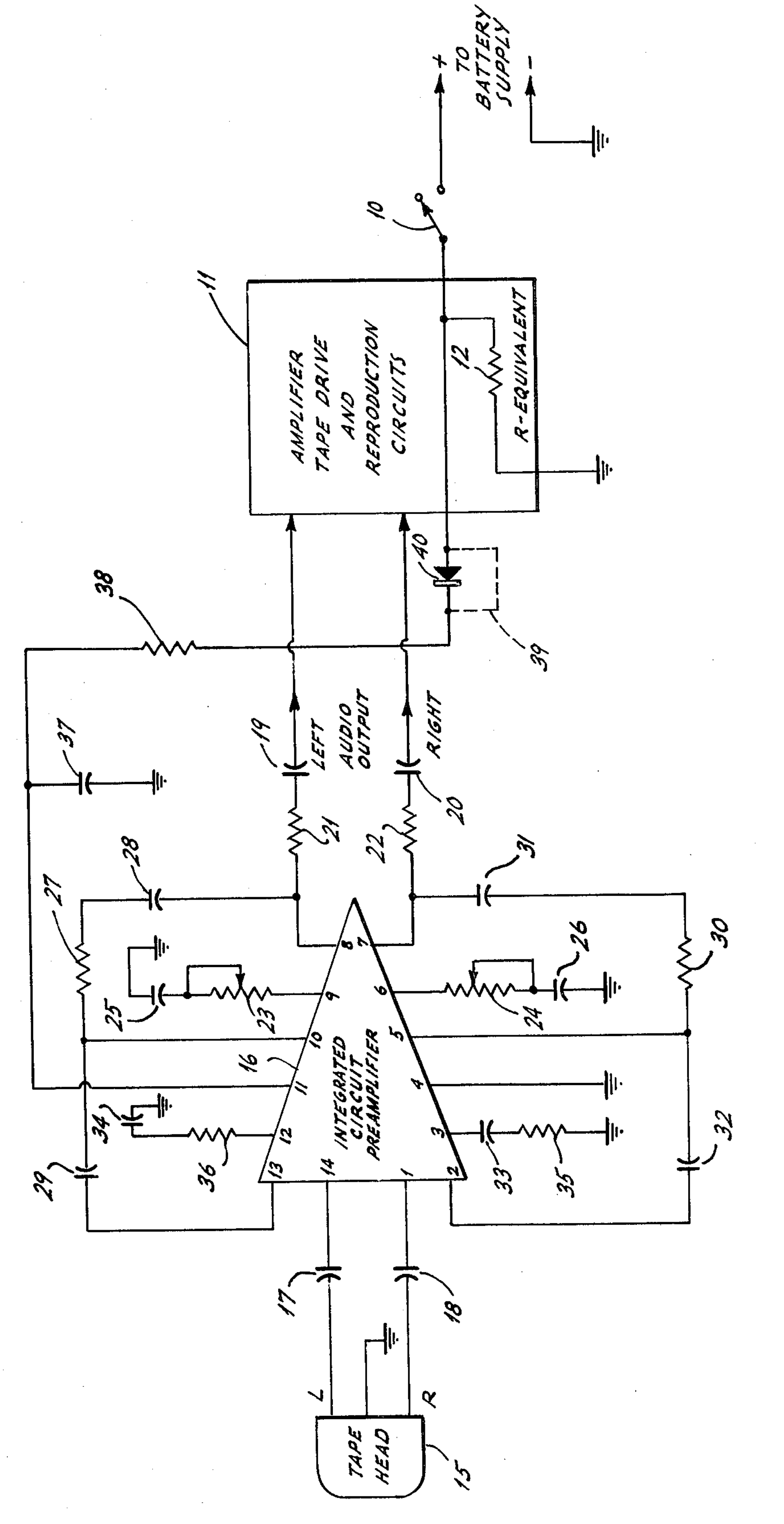

TRANSIENT SUPPRESSION FOR TAPE PLAYER INTEGRATED CIRCUIT PREAMPLIFIER

BACKGROUND OF THE INVENTION

The typical tape player employs a magnetic tape pickup head that produces an output level in the millivolt region. In order to bring the signal level up to a reasonable level, in the region of a volt or so, a high gain preamplifier is employed. It has now become common to fabricate the preamplifier as an integrated circuit. In addition, because of the prevalence of stereo, the same integrated circuit ordinarily comprises two such amplifiers in a single housing. In order to provide good low frequency audio response, directly coupled circuits are widely employed and where capacitor coupled circuits must be employed, large value coupling capacitors are used. While these means do in fact provide excellent signal fidelity, such coupling capacitors can store a substantial quantity of energy and this can become a problem during circuit turn on and turn off. Starting and stopping amplifier transients are well known because they produce explosive sounds in the system loudspeakers. Circuit designs have been developed to cope with these audible symptoms and are well known.

A related but less well known problem has developed in connection with tape players. While a tape player is designed only to play tapes, and may not even be capable of operating in a recording mode, it has been discovered that a tape operating in a player can have, superimposed on its pre-recorded program, a noise burst produced by turning the player off. Clearly the turn-off transient not only affects the sound produced by the loudspeaker, it can, in addition, produce a signal coupled back from the preamplifier into the pickup head which will then transfer the signal onto the tape. In operation, a tape that contains only desired program material will have superimposed on the program a noise pulse each time the player is turned off while the tape is being played. This is a highly undesirable characteristic.

SUMMARY OF THE INVENTION

It is an object of the invention to provide transient suppression in a tape player preamplifier to prevent the application of turn-off transients to the tape head.

It is a further object of the invention to suppress tape player preamplifier turn-off transients with a minimum of components.

These and other objects are achieved in the following manner. A tape player preamplifier circuit has a diode connected in series with its power supply terminal. The diode is poled so as to be biased in its forward direction for normal operation. When the power supply is turned off, the diode will become reverse biased thereby isolating the preamplifier from the power supply. In order to prevent the isolated preamplifier terminal voltage from dropping rapidly, a large value filter capacitor is connected across the preamplifier power supply terminals. This capacitor will become charged and act as a filter capacitor under ordinary conditions. When the power supply is turned off, and the diode acts to isolate the preamplifier, the capacitor can only discharge through the preamplifier. The capacitor is made large enough so that such a discharge occurs slowly enough to avoid any turn-off transients.

BRIEF DESCRIPTION OF THE DRAWING

The single drawing FIGURE shows a circuit arrangement for use with an integrated circuit preamplifier in a stereo tape player.

DESCRIPTION OF THE INVENTION

The tape player circuit in the drawing is shown being operated from a battery supply. This could be the battery circuit of an automobile or it could be the battery in a portable device. Alternatively the supply could be the output of a conventional a-c line power supply. Off-on switch 10 removes or applies power to the tape player and, if the power source were an a-c operated device, the switch could be connected into the primary circuit (not shown). The main portion of the tape player is contained in block 11. This would include the tape drive motor and speed-control circuits (if used), the main amplifier and reproduction devices, and the tone and volume control circuits. If the player is incorporated into or combined with a radio, block 11 would also incorporate the radio and function switching circuits. For simplicity resistor 12, labeled R-Equivalent and connected between the power line and ground, represents the combined current carrying capabilities of the circuits included inside block 11.

Stereo tape head 15 is conventional and is coupled to an integrated circuit preamplifier 16 by means of coupling capacitors 17 and 18. Preamplifier 16 is a conventional stereo device. In the symbol shown, the various numbers inside the device outline represent the package pin connections. The preamplifier outputs are coupled by series R-C couplers, comprising capacitors 19 and 20 and resistors 21 and 22, to the conventional amplifier circuits. Variable resistors 23 and 24 are set to provide the desired preamplifier output levels for the left and right channels respectively. Capacitors 25 and 26 decouple the gain set resistors for d.c. and act as a-c bypass capacitors.

Resistor 27 along with capacitors 28 and 29 provide left channel feedback for stabilization and tone compensation of the integrated circuit. Resistor 30 along with capacitors 31 and 32 do the same for the right channel. Capacitors 33 and 34 along with resistors 35 and 36 are also compensation elements external to the integrated circuit.

Capacitor 37 and resistor 38 constitute a conventional decoupling power line filter and act to connect the preamplifier to a suitable source of operating potential. If dashed line 39 is employed, i.e., if a solid conductive connection is substituted for diode 40, the circuit is completed as would be typical of the prior art.

With connection 39 in place, it can be seen that with switch 10 in its "on" position, the battery positive terminal is connected to power preamplifier 16 by way of resistor 38. Resistor 38 is of such value that only a small voltage drop will be present under normal conditions. It will be noted that R-Equivalent resistance 12 appears between the power supply line and ground. The actual value of this resistor can be computed by dividing the power line voltage by the total operating current. It is sufficient to say that this resistance value is ordinarily quite small — on the order of a few ohms. Of course this value is variable depending upon motor loading, volume setting and other variables.

If a tape is playing normally and switch 10 turned to its off position, any filter capacitors connected across the power line, including capacitor 37, will quickly discharge through R-Equivalent 12 and the voltage at integrated circuit 16 will drop precipitously. It has been discovered that this sudden drop in supply voltage can produce a substantial transient at the preamplifier input terminals. The transient thus produced will be coupled via capacitors 17 and 18 to tape head 15 whereupon a transient-associated noise pulse will be recorded on the tape which will still be moving past the tape head because of tape drive inertia. Upon replay the tape will reproduce an objectionable noise pulse or click at the location where it was previously turned off.

According to the invention, if the dashed circuit connection 39 is removed, diode 40 is operative in the power supply line. Under normal operation, diode 40 is forward biased and will have little effect. It will drop the voltage applied to integrated circuit 16 by about 0.6 volt but this will not be noticed in a 12-volt circuit. Now, if the normally operating tape player is turned off at switch 10, the potential at the anode of diode 40 will quickly drop below the cathode potential and the now back-biased diode will be essentially an open circuit. Thus capacitor 37 is prevented from discharging except through integrated circuit 16. It is in effect isolated from the remainder of the circuit, notably R-Equivalent 12. Since the integrated circuit current drain is small, capacitor 37 will discharge slowly and the applied voltage will not change rapidly. This action avoids the transient described above and therefore avoids the recording of the turn-off transient.

The following set of component values produced the desired performance in a stereo tape player. There was no detectable recording of turn-off transients.

| | | | |
|---|---|---|---|
| Integrated | Circuit 16 | — | LM382 (National Semiconductor) |
| Capacitors | 17 and 18 | — | 1 microfarad |
| Capacitors | 19 and 20 | — | 10 microfarads |
| Resistors | 21 and 22 | — | 680 ohms |
| Rheostats | 23 and 24 | — | 2k ohms |
| Capacitors | 25 and 26 | — | 10 microfarads |
| Resistors | 27 and 30 | — | 100K ohms |
| Capacitors | 28 and 31 | — | .01 microfarad |
| Capacitors | 29 and 32 | — | .027 microfarad |
| Capacitors | 33 and 34 | — | 1.5 microfarads |
| Resistors | 35 and 36 | — | 2.4K ohms |
| Capacitor | 37 | — | 220 microfarads |
| Resistor | 38 | — | 100 ohms |
| Diode | 40 | — | 1N456 |

While the invention has been described and an operating embodiment shown, alternatives will occur to a person skilled in the art. For example, capacitor 37 could be replaced with a smaller capacitor and a capacitance multiplying electronic filter. Diode 40 could be replaced with a switch ganged with switch 10 or the contacts of a suitably operated relay. Accordingly, it is intended that the invention be limited only by the following claims.

I claim:

1. In a magnetic tape player circuit, said circuit comprising a tape head for producing electrical signals when in contact with a moving recorded magnetic tape, a preamplifier connected to said head for amplifying said electrical signals and having power supply terminals for energizing said preamplifier, and a switchable power supply for energizing said tape player, said circuit including a connection between said power supply and said power supply terminals of said preamplifier, said preamplifier having the characteristic of undesirably recording a noise burst on said tape via said tape head when said power supply is switched off and the voltage applied to said power supply terminals from said power supply falls rapidly, means for isolating said preamplifier power supply terminals from said power supply when said power supply is switched off, and means for reducing the rate of fall of voltage applied to said preamplifier when said isolating means acts to isolate said preamplifier.

2. The circuit of claim 1 wherein said means for isolating is a diode connected between said one terminal of said power supply and one terminal of said preamplifier power supply terminals, and said means for reducing the rate of fall of voltage is a capacitor connected across said preamplifier power supply terminals.

3. The circuit of claim 2 wherein said preamplifier is an integrated circuit.

4. In a magnetic tape player circuit, said circuit comprising a magnetic tape head for transducing the information on a moving magnetic tape to an electrical signal, an integrated circuit preamplifier having input signal terminals and a pair of power supply terminals, said input signal terminals being connected to said head so that said preamplifier will raise the level of said signal to a predetermined value, a power supply having an on-off switch, said supply connected to provide operating potential to said tape player and to said integrated circuit, said circuit having the undesirable characteristic of producing a current pulse in said head when said switch is turned from on to off thereby recording a noise pulse on said tape, the improvement comprising:

a semiconductor diode connected between one terminal of said power supply and one of said preamplifier power supply terminals to isolate said preamplifier from said supply when said switch is turned from on to off, said diode poled to be in its conductive state when said power supply is turned on and in its nonconductive state when said power supply is turned off, and a capacitor connected between said power supply terminals of said preamplifier and being of sufficient capacitance to prevent the supply voltage applied to said preamplifier from changing rapidly, whereby said current pulse produced by turning said switch from on to off is avoided.

* * * * *